R. E. DUNHAM.
METALLIC WHEEL.
APPLICATION FILED AUG. 28, 1920.
1,386,167.
Patented Aug. 2, 1921.
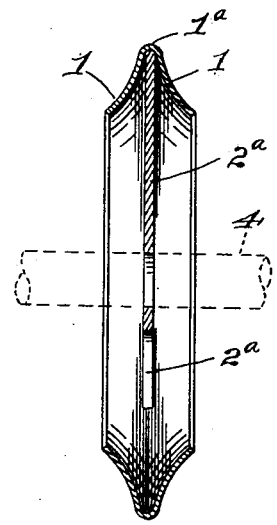
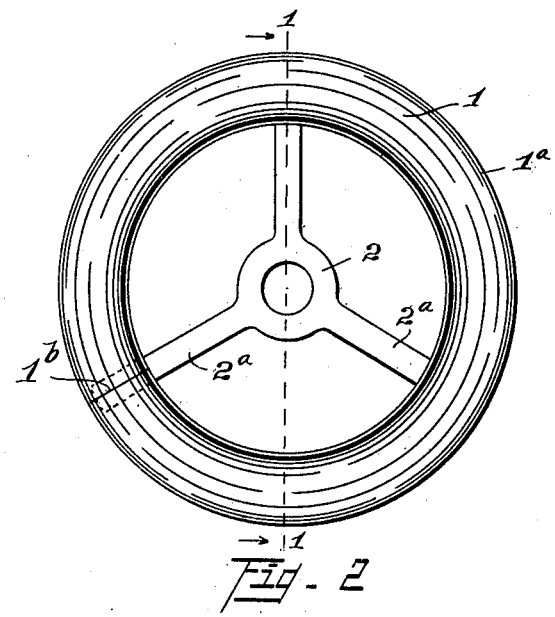
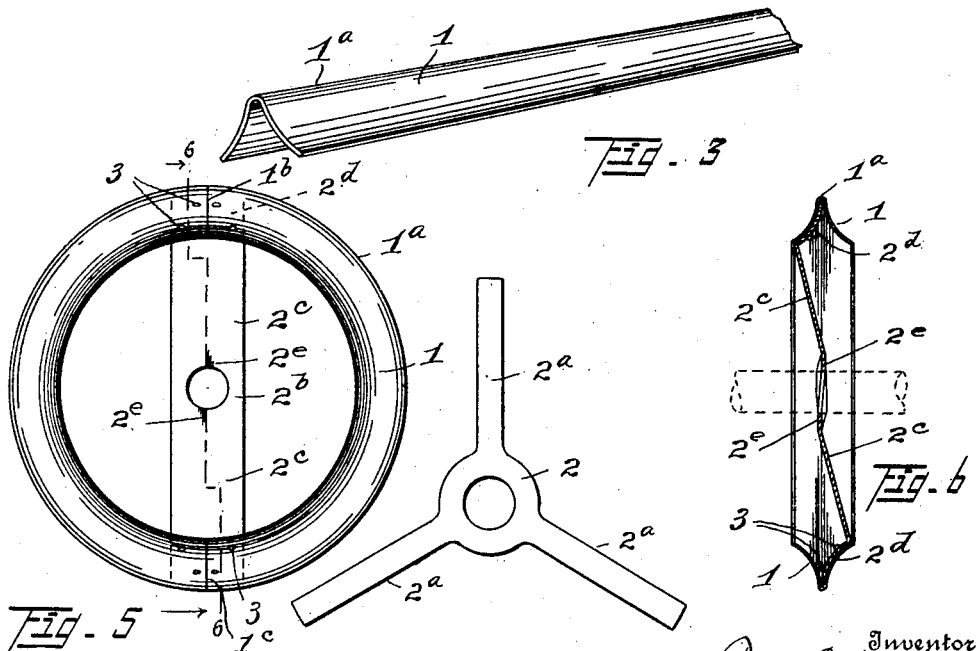
Inventor
Ray E. Dunham
By
Ged E. Billman, Attorney

UNITED STATES PATENT OFFICE.

RAY E. DUNHAM, OF BEREA, OHIO, ASSIGNOR TO DUNHAM COMPANY, OF BEREA, OHIO, A CORPORATION OF OHIO.

METALLIC WHEEL.

1,386,167.   Specification of Letters Patent.   Patented Aug. 2, 1921.

Application filed August 28, 1920. Serial No. 406,698.

*To all whom it may concern:*

Be it known that I, RAY E. DUNHAM, a citizen of the United States, residing at Berea, in the county of Cuyahoga and State of Ohio, have invented certain new and useful Improvements in Metallic Wheels, of which the following is a specification.

My invention relates to improvements in metallic wheels, and more particularly to that class or type which is adapted to be formed of suitable bar or sheet metal through the medium of suitable metal forming and welding machines, and as contradistinguished from cast iron wheels.

The invention further relates to an improved wheel particularly designed and adapted for production in modern metal bending or forming machines, as well as one in which the parts are so arranged and disposed relative to each other that the same may be readily assembled and welded through modern welding processes, and with little if any waste material.

The primary object of the invention is to provide a generally improved metallic wheel of the class indicated, which will be exceedingly simple in construction, cheap of manufacture, and efficient in use.

More specifically speaking, the invention further relates to improvements in agricultural implement wheels commonly known as "pulverizer wheels or disks" arranged in gangs and loosely mounted on an axle for pulverizing and mulching the soil, each of said wheels or disks embodying a V-shaped rim carried on a suitable wheel body.

While for the purpose of illustration I have shown my invention embodied in a metallic wheel having a rim portion comprising exterior concave faces or treads converging outwardly and meeting in a soil-cutting edge, it should be understood that the rim of the wheel may be made in varying forms to meet the varying conditions and that this invention is not, therefore, limited to agricultural wheels of the specific character indicated.

With the above mentioned and other ends in view, the invention consists in the novel construction, arrangement and combination of parts, illustrated in some of its embodiments in the accompanying drawings, and particularly pointed out in the appended claims.

Referring to the drawings, forming a part of this specification, Figure 1 is a central cross sectional view of a wheel embodying this invention and taken on line 2—2 of Fig. 2.

Fig. 2, a side elevation of the same.

Fig. 3, a perspective view of a length of angle bar or metal before being bent up to form the wheel rim and being secured to the wheel body.

Fig. 4, a view of a wheel body blank or spider embodying, in the present instance, suitable hub and spoke members.

Fig. 5, a side elevation of a modified form of wheel.

Fig. 6, a sectional view of the same taken on line 6—6 of Fig. 5.

Similar numerals of reference designate like parts throughout all the figures of the drawings.

The improved wheel embodies a suitable wheel rim which may be of any suitable and desired form, and so likewise the wheel body. In the present instance the wheel rim is substantially V-shaped in cross section and comprises concave exterior faces or treads, 1, meeting in an apex forming a soil cutting or dividing edge, 1ª.

The wheel rim may embody one or more lengths of bars or strips of metal bent and curved about in suitable bending and forming machinery to form the wheel rim, the meeting edges of the rim forming a joint, 1ᵇ.

It will be observed upon reference to Fig. 2 of the drawings that in such instance a one-piece rim is provided, while in the form shown in Figs. 5 and 6 of the drawings a two-piece or two-part rim is provided made up or semi-circular members meeting at diametrically opposite points forming one joint, 1ᵇ, and a second joint, 1ᶜ.

The wheel body may be of any suitable and convenient form, and in the present instance comprises a hub member, 2, and spoke members, 2ª.

The spoke members, 2ª, may be secured to the wheel rim in any suitable and convenient manner, but in the present instance are arranged within the inner channel or apex portion of the substantially V-shaped rim, one of said spokes preferably extending across the joints, 1ᵇ, the latter being preferably butt-welded, and the spoke member being suitably secured by riveting or welding to the adjacent edges in further securing the meeting ends in proper position. The wheel body, or hub and spoke members, may either be of sheet metal or cast.

In Figs. 5 and 6 of the drawings, the rim comprises two semi-circular shaped members bent and curved about from suitable lengths of material and having their meeting ends abutting forming the joints 1ᵇ and 1ᶜ. In this form the wheel body comprises a hub member, 2ᵇ, and spoke members, 2ᶜ. It will be seen that the wheel body made up of the hub and spoke members, 2ᵇ and 2ᶜ, consists of a single length or section of material, the spoke members, 2ᶜ, preferably extending on opposite sides of and being secured to opposite sides of the channel portion of the V-shaped rim, the outer ends of the spoke members, 2ᶜ, preferably terminating in attaching heads, 2ᵈ, extending over the adjacent portions of the rim and across the joints, 1ᵇ and 1ᶜ, said joints being also preferably butt welded and the overlapping heads, 2ᵈ, acting to further secure the ends of the two rim members together, said heads or ends, 2ᵈ, of the spoke members, in the present instance, being secured by means of attaching elements, 3, in the specific form of rivets. If desired, the hub, 2ᵇ, may be provided with cuts or incisions forming struck-out members, 2ᵉ, (see Fig. 6) to form a wider bearing surface of the bearing opening on the axle shaft, 4.

In view of the fact that pulverizer wheels of this class are arranged in abutting relation on the shaft, 4, in forming the pulverizer gangs, the wheel bodies or spokes are not subjected to much lateral strains or stresses since it is obvious that the abutting wheels will act to support each other in service as against such lateral strains and stresses, and, furthermore, each pulverizer wheel moves and rotates entirely independent of the adjacent wheel.

Having thus described some of the embodiments of my invention, without having attempted to set forth all the forms in which it may be made, or all the modes of its use, what I claim and desire to secure by Letters Patent, is,—

1. A metallic wheel, comprising a metallic wheel rim of sheet metal having its ends abutting forming a joint and butt-welded to each other, and a wheel body welded within said rim and across said joint.

2. A metallic wheel, comprising a metallic bar bent into rim form and having the ends thereof abutting forming a joint, and wheel body extending across said joint and secured to said abutting ends.

3. A metallic wheel, comprising a substantially V-shaped rim having the ends thereof forming a radially extending joint, and a wheel body having spoke members extending into and welded to said V-shaped rim.

4. A metal wheel, comprising a metallic bar bent into a V-shaped rim and having the ends thereof abutting and butt-welded, and a wheel body arranged within said V-shaped rim and having portions extending over and secured to said abutting ends for holding the latter together.

5. In a metallic wheel, the combination with a substantially V-shaped rim forming two outwardly inclined portions meeting in a median soil cutting edge and bent in circular form from bar metal, the adjacent edges of said bar metal meeting forming joints, and a hub provided with spoke members extending across and welded to said joints.

6. In a metallic wheel, the combination with a substantially V-shaped rim having the sides thereof outwardly inclined and concaved meeting in a cutting edge and bent in circular form from one or more lengths of metal, the meeting ends thereof forming joints, and a wheel body embodying hub and spoke members, the ends of the latter extending across and being welded to said joints.

7. A metallic wheel, comprising a length of metal bent into a rim having concave exterior tread faces converging outwardly and meeting in a soil penetrating edge, the ends of said lengths of metal forming rim being butt-welded together, and a hub member provided with spokes arranged within said rim, some of said spokes extending across and being secured to the meeting ends of said length of metal forming said rim.

8. A metallic wheel, comprising a V-shaped rim embodying a bar having concave exterior tread faces converging outwardly and meeting in a soil penetrating edge, the ends of said bar forming said rim being butt-welded together, and a hub member provided with spokes arranged within the channel portion of said V-shaped rim, some of said spokes extending across and being secured to the meeting ends of said rim.

9. A metallic wheel, comprising segmental rim members of substantially V-shape in cross section arranged in abutting relation forming joints, and a wheel body comprising a hub arranged in the plane of the apex portion of said V-shaped rim and having oppositely extending spokes extending to the opposite side edges of said rim and terminating over and across said joints and secured to said abutting portions of said segmental rims by attaching elements.

10. A metallic wheel, comprising two semi-circular shaped members of substantially V-shape in cross section arranged in abutting relation forming diametrically opposite joints, and a one-piece wheel body comprising a hub arranged in the median plane of said rim and having oppositely extending spokes extending to opposite sides of said rim terminating in head members extending across said abutting ends and joints and secured to said abutting ends by attaching elements whereby the latter are secured in position.

In testimony whereof I have affixed my signature.

RAY E. DUNHAM.